US 11,601,478 B2

(12) United States Patent
Cox et al.

(10) Patent No.: US 11,601,478 B2
(45) Date of Patent: Mar. 7, 2023

(54) MEDIA SERVER MANAGEMENT FOR COMMUNICATION SESSION

(71) Applicant: Microsoft Technology Licensing, LLC, Redmond, WA (US)

(72) Inventors: Landon Prentice Cox, Seattle, WA (US); Yu Yan, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 64 days.

(21) Appl. No.: 17/362,708

(22) Filed: Jun. 29, 2021

(65) Prior Publication Data

US 2022/0417293 A1 Dec. 29, 2022

(51) Int. Cl.
*H04L 65/1066* (2022.01)
*H04L 67/101* (2022.01)
*H04L 65/612* (2022.01)

(52) U.S. Cl.
CPC ........ *H04L 65/1066* (2013.01); *H04L 65/612* (2022.05); *H04L 67/101* (2013.01)

(58) Field of Classification Search
CPC .. H04L 65/1066; H04L 65/612; H04L 67/101
See application file for complete search history.

(56) References Cited

U.S. PATENT DOCUMENTS

| 2004/0243335 | A1  | 12/2004 | Gunawardena et al. |
| 2021/0218629 | A1* | 7/2021  | Wei ..................... H04L 67/1031 |
| 2021/0281486 | A1* | 9/2021  | Singh Bawa ......... H04L 47/823 |
| 2021/0288890 | A1* | 9/2021  | Johnston ................. H04L 67/01 |

FOREIGN PATENT DOCUMENTS

| EP | 2374244 B1 | 3/2013 |
| EP | 3217595 A1 | 9/2017 |

OTHER PUBLICATIONS

"International Search Report and Written Opinion Issued in PCT Application No. PCT/US22/029942", dated Aug. 26, 2022, 18 Pages.

* cited by examiner

*Primary Examiner* — Wing F Chan
*Assistant Examiner* — Billy H Ng (57) ABSTRACT

A method for communication session management by a session controller is described. Usage data associated with a video communication session is received for data stream handlers of a first network topology, which handle data streams of the video communication session at a first time. The first network topology includes a plurality of client devices and at least a first media server. A second network topology is determined based on the usage data to handle the data streams when a network parameter and/or an application parameter reaches a corresponding update threshold. Data stream handlers of the second network topology include at least a second media server. The data stream handlers of the second network topology are configured to handle the data streams at a second time, including instructing the first media server to offload at least some of the data streams to the second media server.

20 Claims, 7 Drawing Sheets

MEDIA SERVER MANAGEMENT FOR COMMUNICATION SESSION

BACKGROUND

Communication systems such as video-conferencing systems often use a dedicated media server as a centralized forwarding agent for video streams. Generally, a single media server acts as the forwarding agent and receives a video stream from each transmitting client device for a corresponding participant of a communication session. The media server then forwards each received video stream to the remaining participants. However, as new participants join the communication session, the bandwidth required to forward every stream to all participants grows quadratically. Moreover, as participants join from geographically distant areas, overall network efficiency may be reduced as more data streams are transmitted across long distances.

It is with respect to these and other general considerations that embodiments have been described. Also, although relatively specific problems have been discussed, it should be understood that the embodiments should not be limited to solving the specific problems identified in the background.

SUMMARY

Aspects of the present disclosure are directed to communication session management.

In one aspect, a method for communication session management by a session controller is provided. Usage data associated with a video communication session is received for data stream handlers of a first network topology. The data stream handlers of the first network topology handle data streams of the video communication session at a first time during the video communication session. The first network topology includes a plurality of client devices of the video communication session and at least a first media server. A second network topology to handle the data streams of the video communication session is determined based on the usage data when a network parameter and/or an application parameter associated with the video communication session reaches a corresponding update threshold. Data stream handlers of the second network topology include at least a second media server. The data stream handlers of the second network topology are configured to handle the data streams of the video communication session at a second time during the video communication session, including instructing the first media server to offload at least some of the data streams of the video communication session to the second media server.

In another aspect, a method for communication session management by a first media server is provided. Connection requests for a video communication session are received from a plurality of client devices. A plurality of data streams are established for the video communication session. The plurality of data streams include at least one data stream for each of the plurality of client devices. Usage data associated with the video communication session is sent to a session controller. A network topology update for the video communication session is received from the session controller. The network topology update identifies one or more data streams of the plurality of data streams and one or more second media servers. The one or more data streams correspond to offload client devices of the plurality of client devices. One or more control signals are sent to the one or more second media servers and the offload client devices to offload the one or more data streams to the one or more second media servers.

In yet another aspect, a system for communication session management is provided. The system comprises at least one processor and at least one memory storing computer-executable instructions that when executed by the at least one processor cause the system to: receive usage data associated with a video communication session for data stream handlers of a first network topology, wherein the data stream handlers of the first network topology handle data streams of the video communication session at a first time during the video communication session, wherein the first network topology includes a plurality of client devices of the video communication session and at least a first media server; determine, based on the usage data, a second network topology to handle the data streams of the video communication session when a network parameter and/or an application parameter associated with the video communication session reaches a corresponding update threshold, wherein data stream handlers of the second network topology include at least a second media server; and configure the data stream handlers of the second network topology to handle the data streams of the video communication session at a second time during the video communication session, including instructing the first media server to offload at least some of the data streams of the video communication session to the second media server.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS/FIGURES

Non-limiting and non-exhaustive examples are described with reference to the following Figures.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems, or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

The present disclosure describes various examples of a session controller for a communication session among a plurality of client devices. Generally, the client devices are used by a participant or viewer of the communication session, for example, participants in a video conference. Data streams for the communication session may be forwarded by a media server. However, as participants join and leave the communication session, or as network conditions change over time, forwarding by the media server may become less efficient in terms of latency, bandwidth usage, and cost. The session controller is configured to determine an updated network topology for the communication session based on usage data for the communication session. The usage data generally indicates, suggests, or may be used to estimate quality of experience levels for participants, latency, bandwidth usage, and interactivity of the participants. The session controller may determine an updated network topology that uses additional media servers, or fewer media servers, that forward the data streams. In some scenarios, the media servers are chosen based on geolocation data so that geographic distances between adjacent media servers for the client devices and/or collective geographic distances between the client devices and adjacent media servers are reduced.

Figure 1:
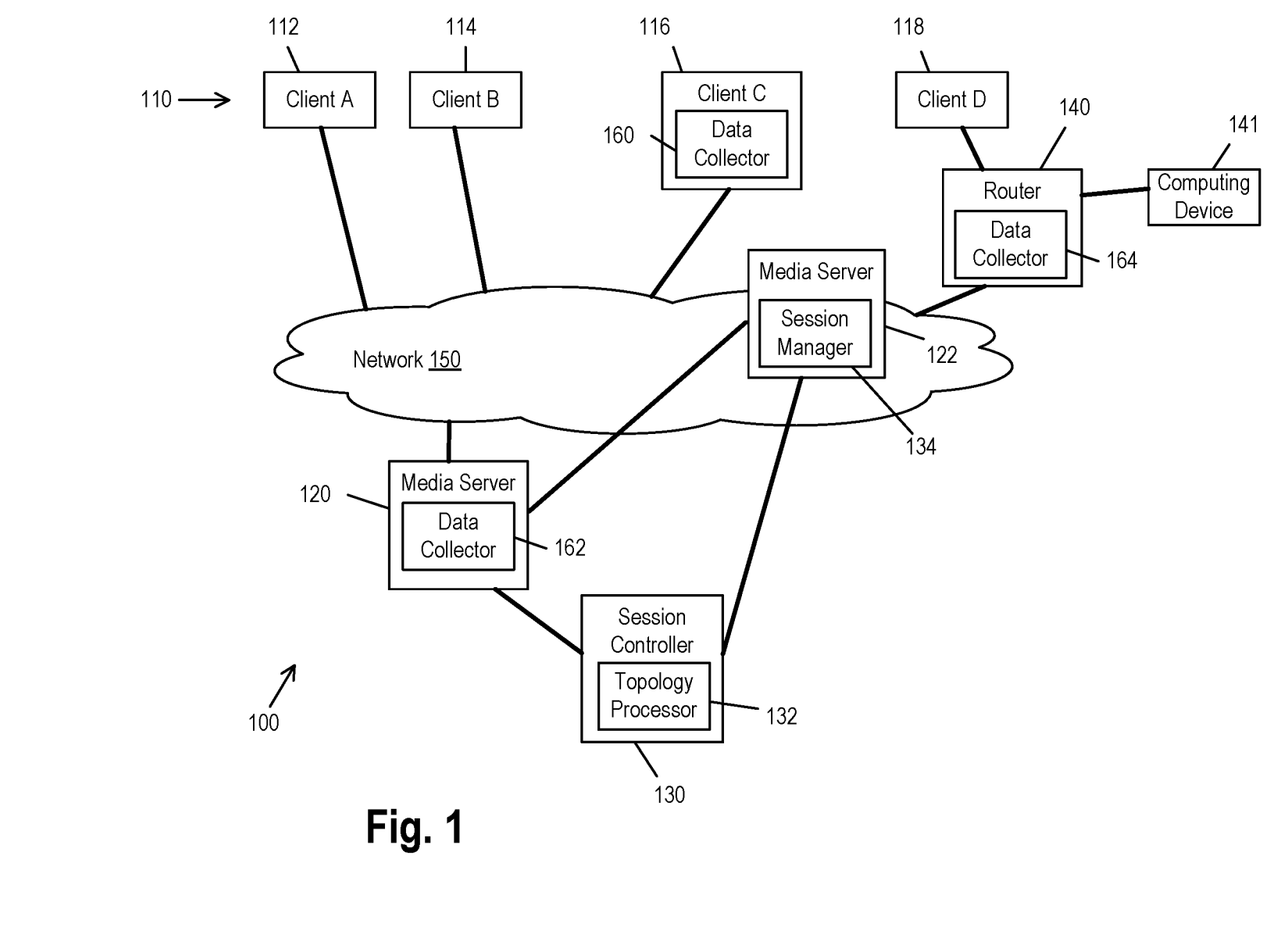
FIG. 1 shows a block diagram of an example of a system configuration in which a session controller for a communication session among a plurality of client devices may be implemented, according to an example embodiment.

This and many further aspects for a computing device are described herein. For instance, FIG. 1 shows a block diagram of an example of a system configuration 100 in which a session controller 130 for a communication session among a plurality of client devices 110 may be implemented, according to an example embodiment. The communication session may be a teleconference, video conference, online document collaboration session, online gaming session, chat session, or other suitable communication session. The communication session may be routed through one or more media servers, such as media servers 120 and 122, as described below. The plurality of client devices 110 are communicatively coupled with the session controller 130 and/or media servers 120 and 122 by a network 150, such as a wide area network (WAN), a local area network (LAN), enterprise network, the Internet, a combination thereof, or other suitable network configuration. The communication links may include one or more of wired and/or wireless portions. In some scenarios, the network 150 includes backbone communication links, long-haul communication links, or other suitable links configured to carry data streams across large geographic areas.

The plurality of client devices 110 comprises a client device 112 ("Client A"), a client device 114 ("Client B"), a client device 116 ("Client C"), and a client device 118 ("Client D"), which may be computing devices having one or more of a user input device (e.g., keyboard, mouse), touch screen display, microphone, display, audio speakers, camera module, etc. The client devices may be personal computers, tablets, smart phones, telephones, or other suitable client devices for a communication session, in various embodiments and/or scenarios. In some embodiments, one or more of the plurality of client devices 110 comprise a neural network model (not shown) for performing machine learning processes. Example machine learning processes may include determination of whether a participant is speaking (e.g., based on audio recorded from a microphone), determining whether a participant is present (e.g., based on facial recognition), or other suitable processing.

In some embodiments, a client device includes a data collector, such as data collector 160 of the client device 116. The data collector 160 is configured to collect usage data, for example, one or more of diagnostic data, content data, status data, or other suitable data from the client device 116 during a communication session. Although the data collector has been omitted from the client devices 112, 114, and 118 for clarity, any of the plurality of client devices 110 may include a data collector, in other embodiments. The data collector 160 provides the usage data to the session controller 130, which allows the session controller 130 to determine network topologies for a communication session, as described below.

Diagnostic data may include an identifier of bandwidth (e.g., transfer rate) used by a data stream (e.g., 75 kilobits per second), a codec identifier used for encoding audio or video within a data stream (e.g., H.264, H.265, MPEG-4), a video resolution of a data stream (e.g., 1920×1080), or other suitable diagnostic data. Content data may include a portion of a data stream, for example, several seconds of audio, one or more images from an image data stream, a portion of a text chat, or other suitable content data. Status data may include a connection status for a network interface (e.g., connected or disconnected), a connection status for a messaging application (e.g., online, offline, in a meeting, etc.), a connection status for a telephone, a window size and/or display area size for displaying a data stream, or other suitable status data. In some embodiments, the data collector 160 processes the usage data to determine an activity level of a participant within a communication session (e.g., active, inactive, last active two minutes ago, etc.) and provides an identifier corresponding to the activity level to the session controller 130. In these embodiments, the data collector 160 may offload at least some of the processing for determining whether to identify a client device as active or inactive, for example.

In some scenarios, a client device may be located behind a router, modem, or other network device that provides network access to multiple devices. In the example shown in FIG. 1, the client device 118 is located behind a router 140 and the router 140 also provides network access to a computing device 141. The router 140 may be a Wi-Fi router, cable modem, network switch, or other suitable device that separates a local area network from the network 150. The router 140 may provide a dynamic host configuration protocol and/or network address translation service, for example. In some embodiments, the router 140 may include a data collector 164 that is generally analogous to the data collector 160 and provides usage data related to the client device 118. In some scenarios, the data collector 164 may provide usage data related to a different device, such as computing device 141. The computing device 141 may be a personal computer, tablet, smartphone, or other device that is connected to the router 140. For example, the client device 118 may be a parent's personal computer used for work, while the computing device 141 may be a personal computer used by the parent's child, a smartphone of the parent, a network-enabled television (or other Internet-of-Things, IoT device), a network-enabled gaming console, or other suitable device. Generally, the computing device 141 is not a member of the plurality of client devices 110 connected to the communication session, but bandwidth utilized by the computing device 141 (e.g., from a video streaming app, online game, etc.) may affect a quality of service of the client device 118 because of a shared network connection (e.g., via the router 140). Accordingly, in some scenarios, the router 140 may provide usage data to the session controller 130 and may even provide usage data related to different communication sessions of the computing device 141 (e.g., bandwidth being used, priority level of the different communication session, etc.).

In various embodiments, the communication session may comprise one, two, three, or more data streams for each client device. In one embodiment, for example, each client device of a teleconference may receive a downlink data stream that includes audio data from the other client devices (e.g., combined by a media server). Moreover, each client device of the teleconference may also transmit an uplink data stream that includes audio data from that client device (e.g. to be combined by the media server and transmitted to the other client devices). For example, in a teleconference among clients A, B, C, and D, the client A transmits an uplink data stream that includes audio data from client A and receives a downlink data stream that includes audio data from clients B, C, and D, the client B transmits an uplink data stream that includes audio data from client B and receives a downlink data stream that includes audio data from clients A, C, and D, and so on.

In another embodiment, each client device of a teleconference may receive a separate downlink data stream with audio data from each of the other client devices of the teleconference and also transmit an uplink data stream with its own audio data. For example, in a teleconference among clients A, B, C, and D, the client A transmits an uplink data stream that includes audio data from client A and receives three separate downlink data streams that include audio data from clients B, C, and D, the client B transmits an uplink data stream that includes audio data from client B and receives three separate downlink data streams that include audio data from clients A, C, and D, and so on.

A communication session may comprise more than one type of data stream. For example, while a teleconference may only include audio data streams, a video conference may include an image data stream and an audio data stream. In some aspects, a communication session may include audio data streams, audio data streams and image data streams (e.g., as separate streams), audio data and image data as a single data stream (e.g., as a video with sound), or other suitable combinations of data streams. The data streams may also include text data streams (e.g., for a chat window), a file data stream (e.g., for a file sharing capability), an application data stream (e.g., for a video game, collaborative editing software), or other suitable data streams. In some embodiments, a client device receives multiple data streams for a communication session, such as separate image data streams for the other client devices, but the image data streams are separate only at an application level and are transmitted to the client device within a single stream at a transport level (e.g., at a transmission control protocol/Internet protocol layer).

In some embodiments and/or scenarios, a client device may provide only a subset of data streams that are utilized within a communication session. For example, during a video conference, the client device 114 may not provide an image data stream when its camera is disabled or turned off by a participant, or the client device 112 may not provide an audio data stream when its microphone has been muted by a participant. In some scenarios, at least some of the client devices 112, 114, 116, and 118 receive a control signal from the session controller 130 that causes the client devices to start, stop, and/or change one or more data streams during the communication session, for example, as client devices are newly connected, disconnected, prioritized, and/or deprioritized during the communication session, as described below.

In some aspects, the communication session is hosted and/or managed by one or more media servers, for example, media server 120 and media server 122. Examples of the media server 120 and/or 122 include network servers, application servers, edge servers, cloud servers, or other suitable computing devices. In some aspects, a plurality of media servers, including media servers 120 and/or 122, is located across large geographic areas, such as across the North America, South America, Europe, Asia, etc. and are communicatively coupled by the network 150. Similarly, the plurality of client devices 110 may be located across large geographic areas.

Generally, the media servers are configured to receive data streams from client devices and forward the data streams to other client devices. In some scenarios, a media server may receive a data stream from a client device via another media server. In other scenarios, a media server may send a data stream to a client device via another media server. As an example using the system configuration 100 shown in FIG. 1, the media server 120 may receive a first data stream from client device 112 and receive a second data stream from the client device 114. The media server 120 may also transmit one or more data streams to the client device 112, one or more data streams to the client device 114, and one or more data streams to the media server 122 (e.g., to reach the client device 116 and client device 118). The media servers may include a data collector, such as the data collector 162 of the media server 120. The data collector 162 is generally analogous to the data collector 160 and provides usage data related to the client device 112 and the client device 114, for example.

In some aspects, the media server 120 and/or media server 122 are configured to combine and/or divide data streams. For example, the media server 122 may combine data streams from the client device 116 and the client device 118 into a single stream that is transmitted to the media server 120. The media server 120 may then combine the single stream (with data streams from client device 116 and 118) with a data stream from the client device 112 and transmit the combined data stream to the client device 114, for example.

The media server 120 and/or media server 122 may be configured to perform one or more processes on at least some of the data streams, for example, to change image quality (e.g., image resolution, color depth, bit rate, compression ratio, codec, image enhancement algorithms, etc.), change audio quality (e.g., bit rate, compression ratio, codec, noise cancellation, echo cancellation, etc.), or change other suitable characteristics of the data streams. As one example, the media server 120 may increase image resolution and add image enhancement algorithm processing to an image data stream from the client device 112. As another example, the media server 122 may reduce a bit rate and stop echo cancellation for an audio data stream from the client device 116. In other words, the media servers 120 and 122 may increase quality and/or decrease quality for various data streams. Moreover, the media servers 120 and 122 may change the characteristics of the data streams during a communication session, as described herein. In some scenarios, the media server 120 and/or 122 (or a different media server) receive one or more control signals from the session controller 130 that cause the media servers 120 and/or 122 to start, stop, and/or change one or more data streams during the communication session, for example, as client devices are newly connected, disconnected, prioritized, and/or deprioritized during the communication session, as described below.

In some aspects, processing on the data streams and even data streams themselves may be divided among two or more media servers for a communication session. As one example, a first media server may handle audio data streams while a second media server may handle image data streams for a communication session (e.g., separate media servers handling the data streams in parallel). As another example, two or more media servers may be connected in series where a first media server performs processing on an audio data stream and performs a pass-through of an image data stream (e.g., forwarding the stream without further processing), while a second media server that receives the processed audio data stream and the image data stream performs image quality enhancement on the image data stream before transmitting the processed audio data stream and enhanced image data stream to a client device (or another media server).

In some embodiments, one or more of the media servers includes a session manager, such as the session manager 134 of the media server 122. The session manager 134 is configured to establish data streams for a communication session and provide usage data to the session controller 130. In some embodiments, the session manager 134 receives an update for a second network topology from the session controller 130 and sends control signals to appropriate data stream handlers to cause a transition (e.g., handover or offloading) to the second network topology. The update may be in the form of a network topology update having instructions for performing the handover or offloading the data streams, for example.

The session controller 130 is a computing device, such as a network server, application server, edge server, cloud server, or other suitable computing device. In some scenarios, the session controller 130 is combined with the media server 120 and/or media server 122 (e.g., implemented or co-hosted on a same network server). Generally, the session controller 130 is configured to receive usage data associated with a communication session for one or more of a plurality of data stream handlers of the communication session.

The session controller 130 includes a topology processor 132 configured to determine a network topology for a communication session, for example, based on usage data received from client devices of the participants, media servers, etc. The data stream handlers for a communication session may be arranged in a first network topology and the topology processor 132 is configured to determine a second network topology for the communication session based on the usage data. The session controller 130 may then send control signals, topology updates, instructions, etc. to cause the data stream handlers to transition to the second network topology.

In various scenarios, the data stream handler may be a client device that originates the data stream and/or a media server that routes the data stream to or from a client device. For example, data stream handlers for a data stream sent from the client device 112 may include the client device 112 which originates the data stream, the media server 120 which routes (e.g., forwards) the data stream to the client device 114 and the media server 122, and the media server 122 which routes the data stream to the client device 116 and the client device 118. In some scenarios, the data stream handler may be the router 140 or another suitable network device.

The network topology is a configuration of the data stream handlers that provides appropriate forwarding of the data streams among the participants in the communication session. As one example, a first network topology for the plurality of client devices 110 may include only the media server 120 where each of the plurality of client devices 110 exchanges data streams with the media server 120. As another example, a second network topology for the plurality of client devices 110 may include the media server 120 and the media server 122, where the client devices 112 and 114 exchange data streams with the media server 120, the client devices 116 and 118 exchange data streams with the media server 122, the media server 120 sends one or more data streams corresponding to the client devices 112 and 114 to the media server 122, and the media server 122 sends one or more data streams corresponding to the client devices 116 and 118 to the media server 120. In other scenarios where the plurality of client devices 110 for a communication session includes hundreds of participants that are spread across a wide geographic area, the data stream handlers for the communication session may include two, three, or more media servers. In some such scenarios, a first media server may forward a data stream to a second media server, which forwards the data stream to a third media server, which forwards the data stream to other client devices.

In various aspects, the topology processor 132 is configured to determine one or more network topologies at different times of the communication session, for example, at initialization of the communication session (e.g., when the communication session is created or a first client device joins), as client devices are newly joined to the communication session, as existing client devices of the communication session are disconnected, and/or as client devices are prioritized and/or deprioritized during the communication session.

In some scenarios, the topology processor 132 monitors one or more parameters related to the communication session, such as network parameters, application parameters, or other suitable parameters, and determines a network topology when the parameters reach an update threshold. In some embodiments, the parameters are included within the usage data described above. Examples of the network parameters (and update thresholds) that the topology processor 132 may monitor include latency data of the plurality of client devices 110 (update threshold: e.g., maximum latency of 100 ms), a total number of the plurality of client devices 110 (update threshold: e.g., multiples of 50 participants), change in link cost (update threshold: e.g., increase of 5%), or other suitable parameters. In some embodiments, the session manager 134 monitors the parameters related to the communication session (e.g., network parameters, application parameters, etc.) and sends a request for a network topology update to the session controller 130 when an update threshold has been reached.

In some scenarios, the topology processor 132 monitors latency individually for each of the plurality of client devices 110 and use an update threshold of 100 ms (e.g., determine an updated network topology when any one client device has a latency of 100 ms or more). In some scenarios, the topology processor 132 monitors a collective latency of the plurality of client devices 110. For example, where the client device 112 has a latency of 20 ms, the client device 114 has a latency of 22 ms, the client device 116 has a latency of 48 ms, and the client device 118 has a latency of 75 ms, the collective latency of the plurality of client devices 110 is 165. In some scenarios, the topology processor 132 may weight portions of the latency data that correspond to higher priority or active devices. For example, the topology processor 132 may weight the latency of a participant that is active or presenting by a factor of 1.5 or 2.0 (e.g., 40 ms weighted to 80 ms), which increases a likelihood of determining the updated network topology when network conditions affecting the presenting client device have deteriorated. In some scenarios, the topology processor 132 uses different thresholds for different client devices or groups of client devices, for example, using thresholds that are more sensitive to deteriorating parameters for presenters, active participants, or other higher priority client devices. The session controller 130 or session manager 134 may be configured to identify active clients and inactive clients (or higher priority, lower priority) based on usage data and determine a network topology that improves a quality of experience for the active clients. In some scenarios, the improvement for the active clients may be at the expense of the inactive clients (e.g., lower latency for active clients, higher latency for inactive clients).

As described above, the usage data may be collected by one or more of data collectors within client devices (e.g., data collector 160), data collectors within media servers (e.g., data collector 162), data collectors within other devices (e.g., data collector 164). The data collectors 160, 162, and 164 may be implemented as one or more of a client application or portion thereof (e.g., an application that supports the communication session), an operating system module, firmware (e.g., camera module firmware, network module firmware), integrated circuit, etc. in various embodiments.

In some embodiments, the usage data is based on content within a data stream. For example, the session controller 130 or session manager 134 may process sound within an audio data stream to determine whether a participant that uses a client device is active or inactive, or determine an activity level of the participant. In various aspects, the session controller 130 identifies an active client device based on conversational dynamics within the communication session, for example, when the participant is speaking, asking a question, answering a question, etc.

In some scenarios, the session controller 130 receives usage data from a client device when a participant of the client device is speaking and/or when the participant is not speaking. The session controller 130 or session manager 134 may determine when a participant is speaking or not speaking based upon a mute status of a microphone of the corresponding client device (e.g., muted corresponding to not speaking, etc.). In some scenarios, the session controller 130 or session manager 134 may analyze a portion of audio from an audio data stream to determine whether the participant is speaking, for example, by performing voice analysis against background noise, voice matching with a prior audio sample of the participant, etc. The session controller 130 or session manager 134 may monitor audio data streams from a client device and track a time at which the participant last spoke (e.g., 5 seconds ago, 2 minutes ago, etc.) and determine that the participant is inactive when that time exceeds a predetermined threshold (e.g., 5 minutes).

The session controller 130 may prioritize a data stream from a client device when a participant of the client device is asking a question, in various embodiments. Since questions are often spoken with a raised inflection (e.g., rising pitch) at an end of the question, the session controller 130 may be configured to identify an asked question when a raised inflection followed by a brief pause is detected during an audio data stream. In some scenarios, the session controller 130 identifies an asked question when a user interface control corresponding to a "hand raise" has been pressed by a participant and the participant is then given an opportunity to speak. The session controller 130 may also prioritize a data stream from a client device when a participant of the client device is answering a question, for example, when speaking after a question has been asked.

In some aspects, the usage data is based on metadata associated with a data stream. For example, the session controller 130 may determine whether a participant is present at a client device and prioritize data streams associated with the client device when the participant is present, while deprioritizing those data streams when the participant is not present (e.g., having left the room or area near the client device). In some examples, the session controller 130 determines whether the participant is present using facial recognition and/or body detection (e.g., the user is present when a face is detected). In other examples, the session controller 130 determines whether the participant is present based on an audio status of the client device (e.g., when a headset or speakers are turned off, the participant is not present). In some scenarios, the session controller 130 detects an intermission (e.g., a break point during a long presentation or seminar) when a plurality of client devices have changed to a "not present" status within a short time period (e.g., within 2 minutes) and avoids changing the active status of the client devices during the intermission.

The session controller 130 may determine whether a participant at a client device is paying attention to, or observing, a display of the client device and prioritize data streams associated with the client device when the participant is paying attention, while deprioritizing those data streams when the participant is not paying attention. The session controller 130 may determine that the participant is paying attention when they are looking at the display (e.g., using facial recognition and/or foveal detection on an image from a camera module), when display windows associated with the communication session are in a foreground of a user interface (e.g., a currently active user interface window), and/or when keyboard and/or mouse activity is detected (e.g., detecting keystrokes, mouse button presses, mouse-related events such as "mouse over", audio that includes keyboard or mouse clicks). In some scenarios, the session controller 130 may determine that a participant is not paying attention when a face is not detected, and/or when keyboard and/or mouse activity has not been detected within a predetermined threshold (e.g., 2 minutes).

In some scenarios, the session controller 130 determines that the participant is not paying attention when other services or applications not associated with the communication session are using a large share of system resources (e.g., memory usage, processor usage, disk drive usage, network bandwidth usage) of the client device that exceed one or more usage thresholds, for example, more than 40% processor usage, more than 200 kbps network bandwidth usage, etc. In some scenarios, the usage thresholds correspond to typical usage for video streaming applications, which may suggest that the participant is watching a movie instead of the communication session. In other scenarios, the session controller 130 determines that the participant is not paying attention when the session controller 130 receives usage data from another data source (not shown), such as a search engine or network service, that indicates the participant (e.g., through an associated login or credentials) has accessed the search engine or network service during the communication session. In one example, the session controller 130 may determine that a participant is paying attention when a window resolution associated with an application for the communication session is maximized, exceeds a size threshold (e.g., taking up 25% of a total screen area), etc. As another example, the session controller 130 may determine that other participants are paying attention to a participant (e.g., a presenter) when a window resolution associated with the participant is maximized and/or exceeds a size threshold, when the other participants are observing the participant (e.g., through foveal detection), etc.

With the advent of 5G, Multi-access Edge Computing (MEC) with data stream processing has become important to improve performance of cloud services. In MEC, there is a hierarchy of devices and servers. For instance, client devices (e.g., the plurality of client devices 110) may transmit data streams to cell towers. The cell towers relay the data stream to edge servers in on-premises (i.e., "on-prem") edges as uplink data traffic. The on-premises edge servers (e.g., media server 120, media server 122) may process the data streams as described above, forward the data streams to other client devices, and transmit usage data to network servers (e.g., session controller 130) at network edges of a cloud infrastructure.

Due to physical constraints (both dimensional and geographic), the edge servers at the on-premises edges have limited computing power and memory capacity when compared to the cloud servers because the edge servers are geographically distributed at locations proximal to the cell towers. It is cost-prohibitive and/or physically infeasible to install extensive computing resources at the edge servers, for example to determine network topologies and configure data stream handlers. However, improved latency and quality of experience is provided when using a MEC network configuration by obtaining usage data based on the data streams at the media server 120 (at the on-prem edge) and sending the usage data to the session controller 130 (at the network edge or within the cloud) for network topology determinations.

Figure 2A:
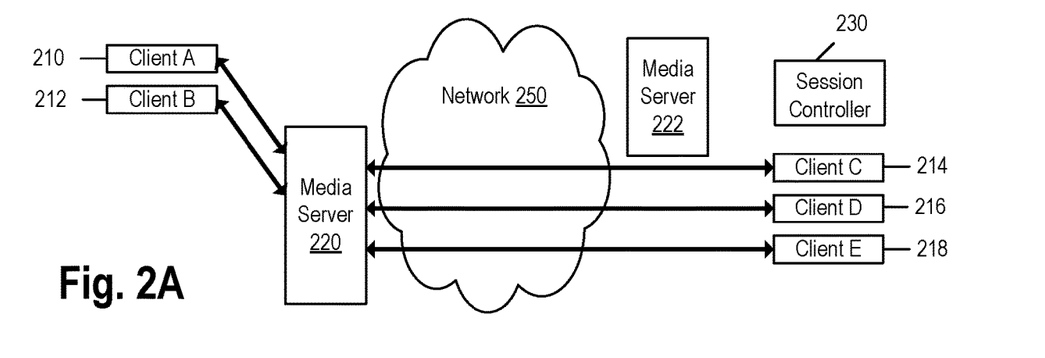
FIGS. 2A, 2B, and 2C show block diagrams of example data streams between client devices and media servers for a communication session, according to an example embodiment.
Figure 2B:
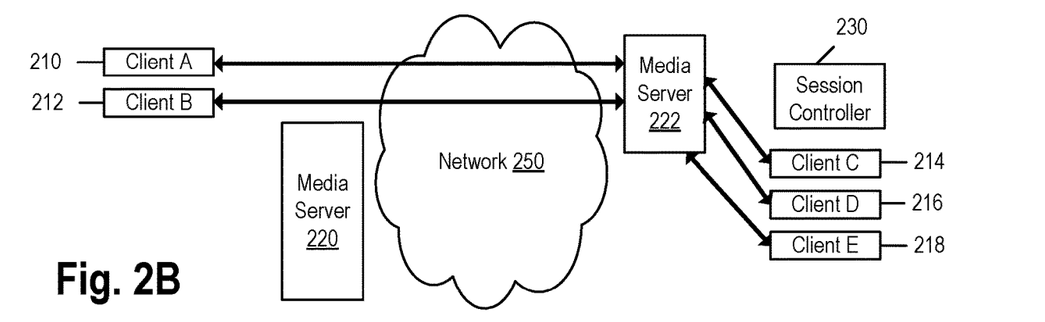
Figure 2C:
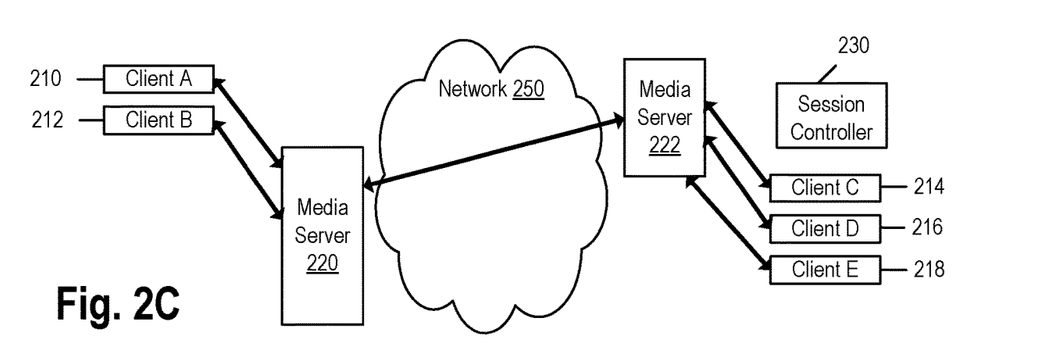

FIGS. 2A, 2B, and 2C show block diagrams of example data streams between client devices 210, 212, 214, 216, and 218 and media servers 220, 222, and/or 224 for a communication session, according to example embodiments. The client devices 210, 212, 214, 216, and 218 generally correspond to the plurality of client devices 110 and the media servers 220, 222, and 224 generally corresponds to the media server 120 and/or 122. The communication session is managed by a session controller 230, which generally corresponds to the session controller 130. The communication session comprises first, second, third, fourth, and fifth data streams between the media servers and the client devices 210, 212, 214, 216, and 218, respectively. Although only five client devices are shown in FIGS. 2A, 2B, and 2C, additional client devices may be joined as participants to the communication session in other scenarios, or at later times during the communication session. Moreover, for clarity, the first, second, third, fourth, and fifth data streams are bidirectional (e.g., both uplink and downlink), but may be divided into multiple streams in other scenarios. In the example embodiments described, for clarity, an example value for latency between a client device and adjacent media server (e.g., client device 210 and media server 220) is 20 ms, an example value for latency between a client device and remote media server across the network 250 (e.g., client device 210 and media server 222) is 80 ms, and an example value for latency between the media servers across the network 250 is 30 ms.

In FIG. 2A, the client devices 210, 212, 214, 216, and 218 exchange the first, second, third, fourth, and fifth data streams, respectively, with the media server 220 in a first scenario using a first network topology. In this first network topology, the third, fourth, and fifth data streams traverse a network 250 (corresponding to network 150) and associated costs (e.g., latency, bandwidth, and processing costs) for three data streams are applicable to the communication session. For example, latency between the client devices 210 and 212 may be 20 ms compared to latency between the client device 210 and the client devices 214, 216, and 218 which may be 100 ms (e.g., due to traversing the network 250).

In FIG. 2B, the client devices 210, 212, 214, 216, and 218 exchange the first, second, third, fourth, and fifth data streams, respectively, with the media server 222 in a second scenario using a second network topology determined by the session controller 230. In this second network topology, the first and second data streams traverse the network 250 and associated costs (e.g., latency, bandwidth, and processing costs) for two data streams (instead of three) are applicable to the communication session. Accordingly, the second network topology may provide a reduced cost or improved quality of experience (e.g., reduced latency) for the communication session.

In FIG. 2C, the client devices 210 and 212 exchange the first and second data streams, respectively, with the media server 220, while the client devices 214, 216, and 218 exchange the third, fourth, and fifth data streams, respectively, with the media server 222 in a third scenario using a third network topology determined by the session controller 230. In this third network topology, a backhaul stream between the media server 220 and the media server 222 traverses the network 250 over a backhaul connection that provides reduced latency. The third network topology may provide a reduced cost or improved quality of experience (e.g., reduced latency) for the communication session due to reduced latency over the backhaul connection.

Although only two media servers are shown in FIGS. 2A, 2B, and 2C, in other scenarios, the session controller 230 may determine a network topology having three or four media servers, for example. In one such example, the client devices 210 and 212 exchange the first and second data streams, respectively, with the media server 220 (a first media server), while the client devices 214 and 216 exchange the third and fourth data streams, respectively, with the media server 222 (a second media server), while the client device 218 exchanges the fifth data stream with a third media server (not shown) using a fourth network topology. In the fourth network topology, in one scenario, the first media server and the second media server exchange a first backhaul stream and the first media server and the third media server exchange a second backhaul stream. In another scenario, the first media server and the second media server exchange the first backhaul stream, the first media server and the third media server exchange the second backhaul stream, and the second media server and the third media server exchange a third backhaul stream. In some scenarios, the session controller 230 determines a network topology having two or more layers of media servers arranged in a hierarchy.

Figure 3:
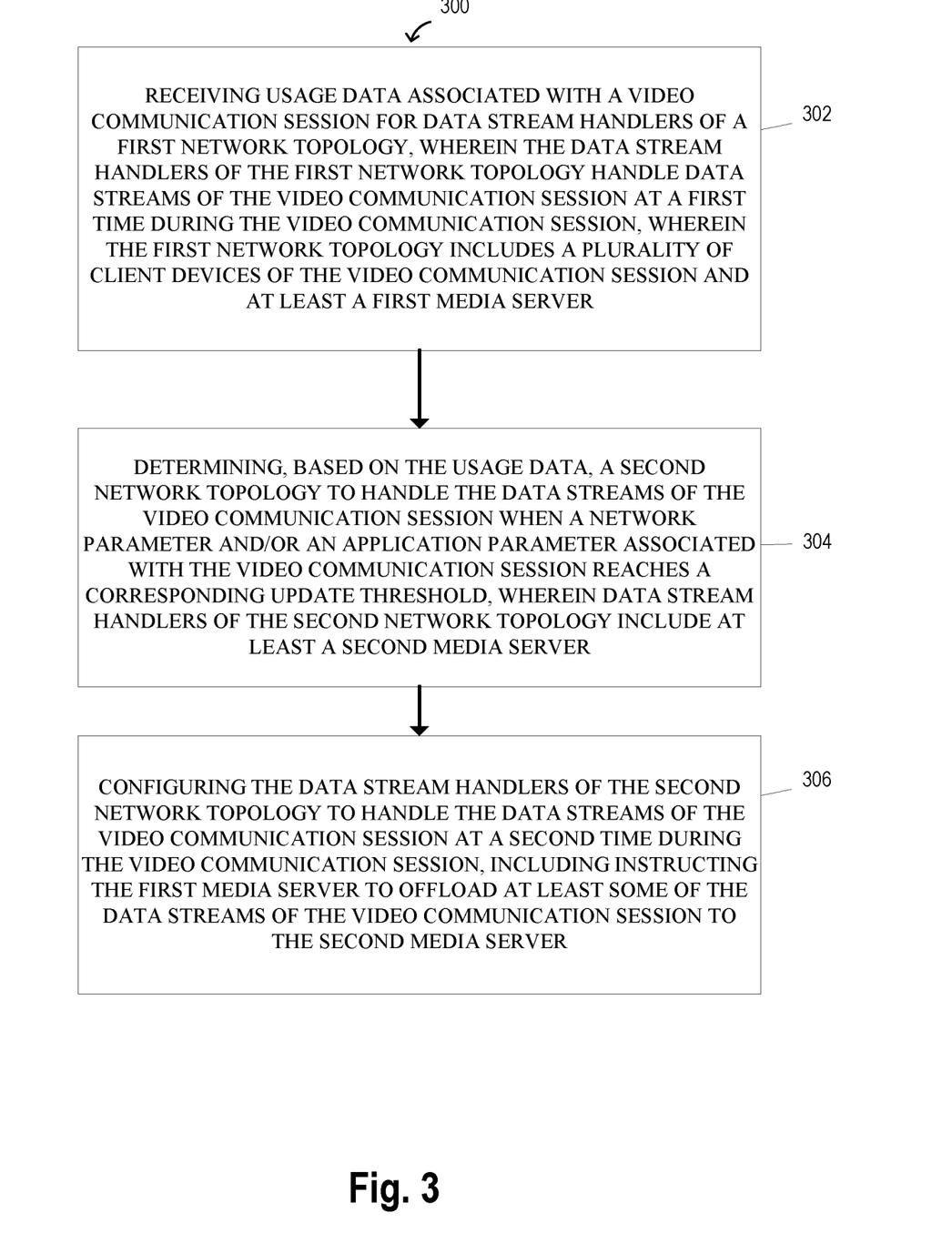
FIG. 3 shows a flowchart of an example method for communication session management, according to an example embodiment.

FIG. 3 shows a flowchart of an example method 300 for communication session management, according to an example embodiment. Technical processes shown in these figures will be performed automatically unless otherwise indicated. In any given embodiment, some steps of a process may be repeated, perhaps with different parameters or data to operate on. Steps in an embodiment may also be performed in a different order than the top-to-bottom order that is laid out in FIG. 3. Steps may be performed serially, in a partially overlapping manner, or fully in parallel. Thus, the order in which steps of method 300 are performed may vary from one performance to the process of another performance of the process. Steps may also be omitted, combined, renamed, regrouped, be performed on one or more machines, or otherwise depart from the illustrated flow, provided that the process performed is operable and conforms to at least one claim. The steps of FIG. 3 may be performed by the session controller 130 (e.g., via the topology processor 132) or other suitable computing device.

Method 300 begins with step 302. At step 302, usage data associated with a video communication session is received for data stream handlers of a first network topology. The data stream handlers of the first network topology handle data streams of the video communication session at a first time during the video communication session. The first network topology includes a plurality of client devices of the video communication session and at least a first media server. In an embodiment, the session controller corresponds to the session controller 230, the first media server corresponds to the media server 220, and the plurality of client devices correspond to the client devices 210, 212, 214, 216, and 218. The first network topology may correspond to the first network topology of FIG. 2A. In some aspects, the usage data includes a collective latency for the first network topology. In other aspects, the usage data indicates, suggests, or may be used to estimate quality of experience levels for participants, latency, bandwidth usage, and interactivity of the participants, as described above.

At step 304, a second network topology to handle the data streams of the video communication session is determined based on the usage data when a network parameter and/or an application parameter associated with the video communication session reaches a corresponding update threshold. Data stream handlers of the second network topology include at least a second media server. The second network topology may correspond to the second network topology of FIG. 2B or the third network topology of FIG. 2C, for example. In some embodiments, the second network topology further includes the first media server. In an embodiment, step 304 includes dynamically determining the second network topology during the video communication session, for example, at predetermined time intervals or events (e.g., when a client joins or leaves the communication session).

At step 306, the data stream handlers of the second network topology are configured to handle the data streams of the video communication session at a second time during the video communication session, including instructing the first media server to offload at least some of the data streams of the video communication session to the second media server. In an embodiment, for example, the session controller 230 sends one or more prioritization control instructions to the media server 220.

In some aspects, step 306 comprises sending a first control signal to the first media server to instruct the first media server to offload the at least some of the data streams of the video communication session to the second media server. Step 306 may further comprise sending second control signals to offload client devices of the plurality of client devices to cause the offload client devices to transition from the first network topology to the second network topology, the offload client devices corresponding to the portion of the data streams offload to the second media server.

In some embodiments, the second network topology omits the first media server and step 306 includes sending a control signal to the first media server to cause the first media server to hand over each of the data streams of the video communication session to the second media server. In this example, the first media server is no longer a data stream handler of the video communication session after the handover.

In some embodiments, the method 300 also comprises receiving usage data for a plurality of media servers that includes the second media server, wherein the first network topology does not include the second media server. The method 300 also comprises selecting the second media server from among the plurality of media servers for the second network topology based on the usage data for the plurality of media servers and the usage data associated with the video communication session.

In some aspects, the method 300 also comprises sending usage probes that prompt the plurality of media servers to send the usage data for the plurality of media servers. In some aspects, the usage probes include data packets configured to simulate a reference communication session (e.g., a stream of data packets having a size typical of a video communication session). In other aspects, the usage probes include data packets configured to simulate the video communication session (e.g., having similar size to packets of the data streams of the video communication session). In these aspects, the session controller 130 may estimate a quality of experience (e.g. latency, packet loss, etc.) for some or all of the plurality of client devices 110 based on the simulated communication session and usage data associated with the usage probes.

In an embodiment, the method 300 also comprises receiving geolocation data of the plurality of client devices, obtaining geolocation data of a plurality of media servers that includes the second media server, and determining the second network topology to reduce collective geographic distances between the plurality of client devices and the second media server.

In another embodiment, the method 300 also comprises receiving latency data of the plurality of client devices, obtaining latency data of a plurality of media servers that includes the second media server, selecting the second media server from among the plurality of media servers to reduce a collective latency of the plurality of client devices for the second network topology.

Figure 4:
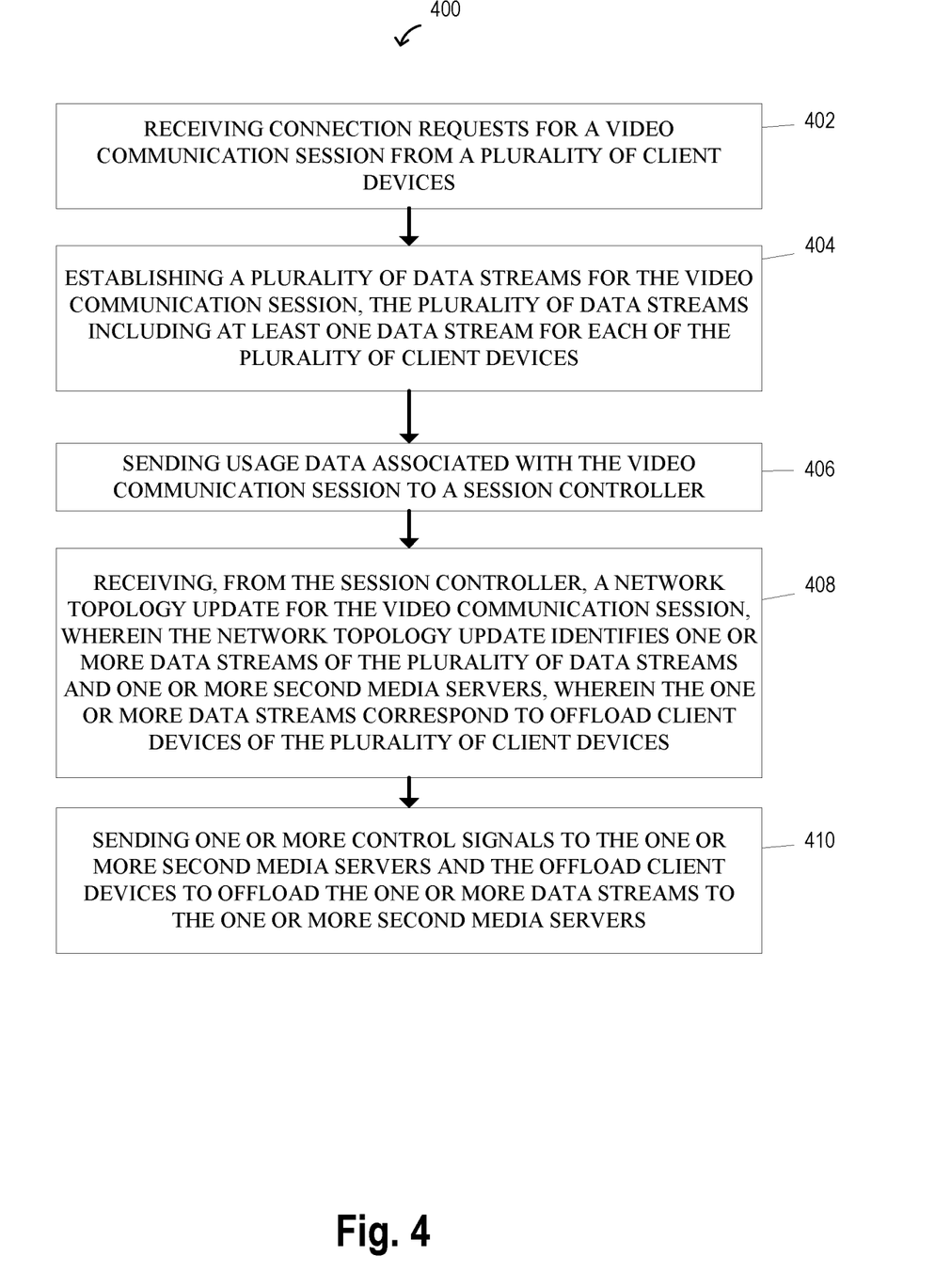
FIG. 4 shows a flowchart of an example method for communication session management, according to an example embodiment.

FIG. 4 shows a flowchart of an example method 400 for communication session management, according to an example embodiment. Technical processes shown in these figures will be performed automatically unless otherwise indicated. In any given embodiment, some steps of a process may be repeated, perhaps with different parameters or data to operate on. Steps in an embodiment may also be performed in a different order than the top-to-bottom order that is laid out in FIG. 4. Steps may be performed serially, in a partially overlapping manner, or fully in parallel. Thus, the order in which steps of method 400 are performed may vary from one performance to the process of another performance of the process. Steps may also be omitted, combined, renamed, regrouped, be performed on one or more machines, or otherwise depart from the illustrated flow, provided that the process performed is operable and conforms to at least one claim. The steps of FIG. 4 may be performed by the media server 122 (e.g., via the session manager 134) or other suitable computing device.

Method 400 begins with step 402. At step 402, connection requests for a communication session are received by a first media server from a plurality of client devices. The first media server may correspond to the media servers 120, 122, 220, and/or 222. The plurality of client devices may correspond to the plurality of client devices 110 and/or the client devices 210, 212, 214, 216, and 218.

At step 404, a plurality of data streams for the communication session are established by the first media server. The plurality of data streams may include at least one data stream for each of the plurality of client devices.

At step 406, usage data associated with the communication session is sent by the first media server to a session controller. The session controller may correspond to the session controller 130 and/or session controller 230.

At step 408, a network topology update for the communication session is received by the first media server from the session controller. The network topology update identifies one or more data streams of the plurality of data streams and one or more second media servers. The one or more data streams correspond to offload client devices of the plurality of client devices. The network topology update may correspond to instructions for handing over or offloading data streams corresponding to the second network topology of FIG. 2B and/or the third network topology of FIG. 2C.

At step 410, one or more control signals are sent to the one or more second media servers and the offload client devices to offload the one or more data streams to the one or more second media servers.

In various embodiments, the network topology update identifies the plurality of data streams, for example, using numerical identifiers, identifiers corresponding to the corresponding client device (e.g., a MAC address or IP address), or other suitable identifier. Sending the one or more control signals may include sending the one or more control signals to hand over each of the plurality of data streams to the one or more second media servers.

In some scenarios, the method 400 further includes sending a request for the network topology update to the session controller when a new connection request is received from a new client device. In other scenarios, the method 400 further includes monitoring a quality of experience of the plurality of client devices for the video communication session, and sending a request for the network topology update to the session controller when the quality of experience reaches an update threshold. In still other scenarios, the method 400 further includes sending a request for the network topology update to the session controller when prioritization levels of the plurality of client devices has changed.

Figure 5:
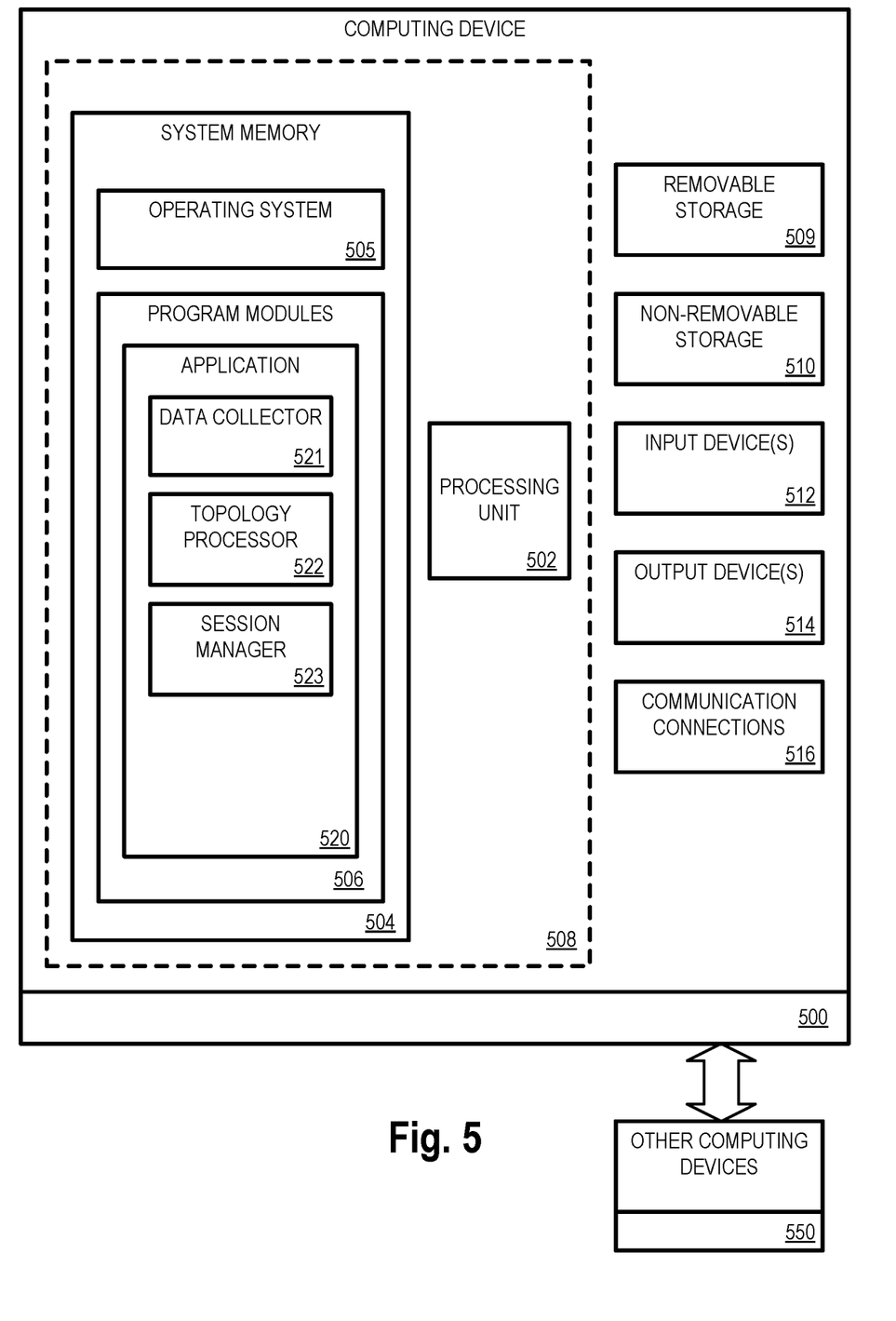
FIG. 5 is a block diagram illustrating example physical components of a computing device with which aspects of the disclosure may be practiced.
Figure 6:
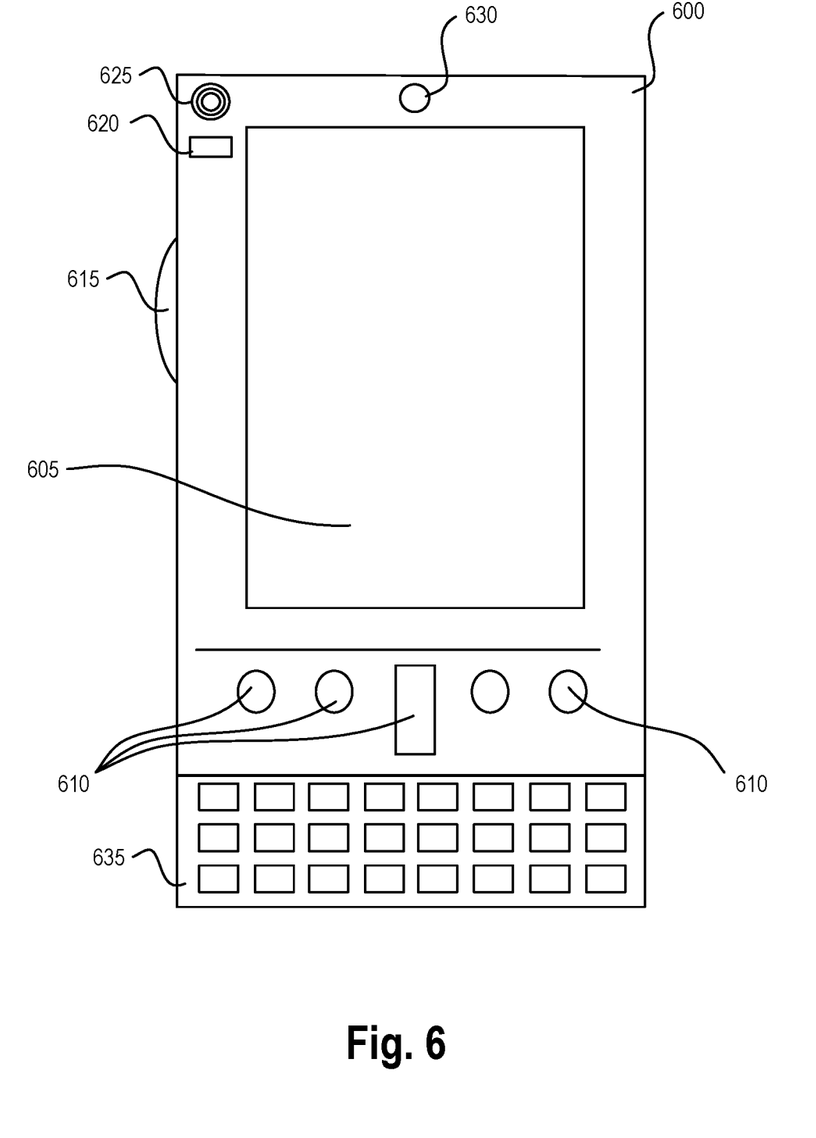
FIGS. 6 and 7 are simplified block diagrams of a mobile computing device with which aspects of the present disclosure may be practiced.
Figure 7:
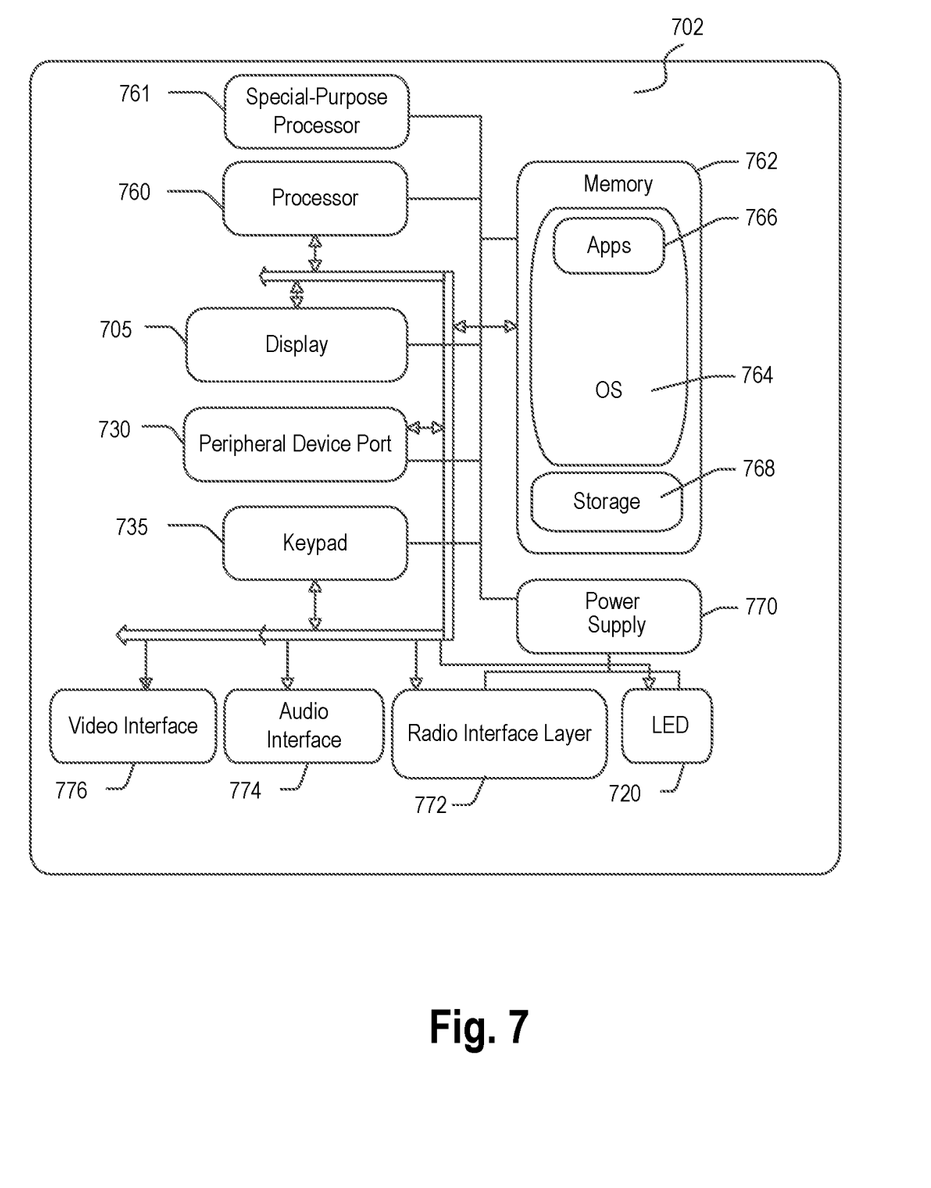

FIGS. 5-7 and the associated descriptions provide a discussion of a variety of operating environments in which aspects of the disclosure may be practiced. However, the devices and systems illustrated and discussed with respect to FIGS. 5-7 are for purposes of example and illustration and are not limiting of a vast number of computing device configurations that may be utilized for practicing aspects of the disclosure, as described herein.

FIG. 5 is a block diagram illustrating physical components (e.g., hardware) of a computing device 500 with which aspects of the disclosure may be practiced. The computing device components described below may have computer executable instructions for implementing a media server management application 520 on a computing device (e.g., session controllers 130 and/or 230, media servers 120, 122, 220, and/or 222), including computer executable instructions for media server management application 520 that can be executed to implement the methods disclosed herein. In a basic configuration, the computing device 500 may include at least one processing unit 502 and a system memory 504. Depending on the configuration and type of computing device, the system memory 504 may comprise, but is not limited to, volatile storage (e.g., random access memory), non-volatile storage (e.g., read-only memory), flash memory, or any combination of such memories. The system memory 504 may include an operating system 505 and one or more program modules 506 suitable for running media server management application 520, such as one or more components with regard to FIGS. 1 and 2 and, in particular, data collector 521 (e.g., corresponding to data collectors 160, 162, 164), topology processor 522 (e.g., corresponding to topology processor 132), and session manager 523 (e.g., corresponding to session manager 134).

The operating system 505, for example, may be suitable for controlling the operation of the computing device 500. Furthermore, embodiments of the disclosure may be practiced in conjunction with a graphics library, other operating systems, or any other application program and is not limited to any particular application or system. This basic configuration is illustrated in FIG. 5 by those components within a dashed line 508. The computing device 500 may have additional features or functionality. For example, the computing device 500 may also include additional data storage devices (removable and/or non-removable) such as, for example, magnetic disks, optical disks, or tape. Such additional storage is illustrated in FIG. 5 by a removable storage device 509 and a non-removable storage device 510.

As stated above, a number of program modules and data files may be stored in the system memory 504. While executing on the processing unit 502, the program modules 506 (e.g., media server management application 520) may perform processes including, but not limited to, the aspects, as described herein. Other program modules that may be used in accordance with aspects of the present disclosure, and in particular for prioritizing data streams, may include data collector 521, topology processor 522, and session manager 523.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 500 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 500 may also have one or more input device(s) 512 such as a keyboard, a mouse, a pen, a sound or voice input device, a touch or swipe input device, etc. The output device(s) 514 such as a display, speakers, a printer, etc. may also be included. The aforementioned devices are examples and others may be used. The computing device 500 may include one or more communication connections 516 allowing communications with other computing devices 550. Examples of suitable communication connections 516 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 6 and 7 illustrate a mobile computing device 600, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 6, one aspect of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display). If included, an optional side input element 615 allows further user input. The side input element 615 may be a rotary switch, a button, or any other type of manual input element. In alternative aspects, mobile computing device 600 may incorporate more or less input elements. For example, the display 605 may not be a touch screen in some embodiments. In yet another alternative embodiment, the mobile computing device 600 is a portable phone system, such as a cellular phone. The mobile computing device 600 may also include an optional keypad 635. Optional keypad 635 may be a physical keypad or a "soft" keypad generated on the touch screen display. In various embodiments, the output elements include the display 605 for showing a graphical user interface (GUI), a visual indicator 620 (e.g., a light emitting diode), and/or an audio transducer 625 (e.g., a speaker). In some aspects, the mobile computing device 600 incorporates a vibration transducer for providing the user with tactile feedback. In yet another aspect, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 7 is a block diagram illustrating the architecture of one aspect of a mobile computing device. That is, the mobile computing device 600 can incorporate a system (e.g., an architecture) 702 to implement some aspects. In one embodiment, the system 702 is implemented as a "smart phone" capable of running one or more applications (e.g., browser, e-mail, calendaring, contact managers, messaging clients, games, and media clients/players). In some aspects, the system 702 is integrated as a computing device, such as an integrated personal digital assistant (PDA) and wireless phone.

One or more application programs 766 may be loaded into the memory 762 and run on or in association with the operating system 764. Examples of the application programs include phone dialer programs, e-mail programs, personal information management (PIM) programs, word processing programs, spreadsheet programs, Internet browser programs, messaging programs, and so forth. The system 702 also includes a non-volatile storage area 768 within the memory 762. The non-volatile storage area 768 may be used to store persistent information that should not be lost if the system 702 is powered down. The application programs 766 may use and store information in the non-volatile storage area 768, such as email or other messages used by an email application, and the like. A synchronization application (not shown) also resides on the system 702 and is programmed to interact with a corresponding synchronization application resident on a host computer to keep the information stored in the non-volatile storage area 768 synchronized with corresponding information stored at the host computer.

The system 702 has a power supply 770, which may be implemented as one or more batteries. The power supply 770 may further include an external power source, such as an AC adapter or a powered docking cradle that supplements or recharges the batteries.

The system 702 may also include a radio interface layer 772 that performs the function of transmitting and receiving radio frequency communications. The radio interface layer 772 facilitates wireless connectivity between the system 702 and the "outside world," via a communications carrier or service provider. Transmissions to and from the radio interface layer 772 are conducted under control of the operating system 764. In other words, communications received by the radio interface layer 772 may be disseminated to the application programs 766 via the operating system 764, and vice versa.

The visual indicator 720 may be used to provide visual notifications, and/or an audio interface 774 may be used for producing audible notifications via an audio transducer 625 (e.g., audio transducer 625 illustrated in FIG. 6). In the illustrated embodiment, the visual indicator 720 is a light emitting diode (LED) and the audio transducer 625 may be a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 625, the audio interface 774 may also be coupled to a microphone to receive audible input, such as to facilitate a telephone conversation. In accordance with embodiments of the present disclosure, the microphone may also serve as an audio sensor to facilitate control of notifications, as will be described below. The system 702 may further include a video interface 776 that enables an operation of peripheral device 730 (e.g., on-board camera) to record still images, video stream, and the like.

A mobile computing device 600 implementing the system 702 may have additional features or functionality. For example, the mobile computing device 600 may also include additional data storage devices (removable and/or non-removable) such as, magnetic disks, optical disks, or tape. Such additional storage is illustrated in FIG. 7 by the non-volatile storage area 768.

Data/information generated or captured by the mobile computing device 600 and stored via the system 702 may be stored locally on the mobile computing device 600, as described above, or the data may be stored on any number of storage media that may be accessed by the device via the radio interface layer 772 or via a wired connection between the mobile computing device 600 and a separate computing device associated with the mobile computing device 600, for example, a server computer in a distributed computing network, such as the Internet. As should be appreciated such data/information may be accessed via the mobile computing device 600 via the radio interface layer 772 or via a distributed computing network. Similarly, such data/information may be readily transferred between computing devices for storage and use according to well-known data/information transfer and storage means, including electronic mail and collaborative data/information sharing systems.

As should be appreciated, FIGS. 6 and 7 are described for purposes of illustrating the present methods and systems and is not intended to limit the disclosure to a particular sequence of steps or a particular combination of hardware or software components.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method for communication session management by a session controller, the method comprising:
   receiving usage data associated with a video communication session for data stream handlers of a first network topology, wherein the data stream handlers of the first network topology handle data streams of the video communication session at a first time during the video communication session, wherein the first network topology includes a plurality of client devices of the video communication session and at least a first media server;
   determining, based on the usage data, a second network topology to handle the data streams of the video communication session when a network parameter and/or an application parameter associated with the video communication session reaches a corresponding update threshold, wherein data stream handlers of the second network topology include at least a second media server; and
   configuring the data stream handlers of the second network topology to handle the data streams of the video communication session at a second time during the video communication session, including instructing the first media server to offload at least some of the data streams of the video communication session to the second media server.

2. The method of claim 1, the method further comprising:
   receiving usage data for a plurality of media servers that includes the second media server, wherein the first network topology does not include the second media server; and
   selecting the second media server from among the plurality of media servers for the second network topology based on the usage data for the plurality of media servers and the usage data associated with the video communication session.

3. The method of claim 2, the method further comprising:
   sending usage probes that prompt the plurality of media servers to send the usage data for the plurality of media servers.

4. The method of claim 3, wherein the video communication session is a first video communication session and the usage probes include data packets configured to simulate a reference communication session.

5. The method of claim 3, wherein the usage probes include data packets configured to simulate the video communication session.

6. The method of claim 3, wherein the usage data includes a collective latency for the first network topology.

7. The method of claim 1, wherein the second network topology further includes the first media server.

8. The method of claim 7, wherein configuring the data stream handlers comprises:
   sending a first control signal to the first media server to instruct the first media server to offload the at least some of the data streams of the video communication session to the second media server; and
   sending second control signals to offload client devices of the plurality of client devices to cause the offload client devices to transition from the first network topology to the second network topology, the offload client devices corresponding to the portion of the data streams offload to the second media server.

9. The method of claim 1, wherein:
the second network topology omits the first media server; and
configuring the data stream handlers comprises sending a control signal to the first media server to cause the first media server to hand over each of the data streams of the video communication session to the second media server.

10. The method of claim 1, wherein receiving the usage data comprises receiving geolocation data of the plurality of client devices;
wherein determining the second network topology comprises:
obtaining geolocation data of a plurality of media servers that includes the second media server; and
determining the second network topology to reduce collective geographic distances between the plurality of client devices and the second media server.

11. The method of claim 1, wherein receiving the usage data comprises receiving latency data of the plurality of client devices;
wherein determining the second network topology comprises:
obtaining latency data of a plurality of media servers that includes the second media server; and
selecting the second media server from among the plurality of media servers to reduce a collective latency of the plurality of client devices for the second network topology.

12. The method of claim 11, wherein determining the second network topology comprises dynamically determining the second network topology during the video communication session.

13. A method for communication session management by a first media server, the method comprising:
receiving connection requests for a video communication session from a plurality of client devices;
establishing a plurality of data streams for the video communication session, the plurality of data streams including at least one data stream for each of the plurality of client devices;
sending usage data associated with the video communication session to a session controller;
receiving, from the session controller, a network topology update for the video communication session, wherein the network topology update identifies one or more data streams of the plurality of data streams and one or more second media servers, wherein the one or more data streams correspond to offload client devices of the plurality of client devices;
sending one or more control signals to the one or more second media servers and the offload client devices to offload the one or more data streams to the one or more second media servers.

14. The method of claim 13, wherein:
the network topology update identifies the plurality of data streams; and
sending the one or more control signals comprises sending the one or more control signals to hand over each of the plurality of data streams to the one or more second media servers.

15. The method of claim 13, the method further comprising sending a request for the network topology update to the session controller when a new connection request is received from a new client device.

16. The method of claim 13, the method further comprising:
monitoring a quality of experience of the plurality of client devices for the video communication session;
sending a request for the network topology update to the session controller when the quality of experience reaches an update threshold.

17. The method of claim 13, the method further comprising:
sending a request for the network topology update to the session controller when prioritization levels of the plurality of client devices has changed.

18. A system for communication session management, the system comprising:
at least one processor, and
at least one memory storing computer-executable instructions that when executed by the at least one processor cause the system to:
receive usage data associated with a video communication session for data stream handlers of a first network topology, wherein the data stream handlers of the first network topology handle data streams of the video communication session at a first time during the video communication session, wherein the first network topology includes a plurality of client devices of the video communication session and at least a first media server;
determine, based on the usage data, a second network topology to handle the data streams of the video communication session when a network parameter and/or an application parameter associated with the video communication session reaches a corresponding update threshold, wherein data stream handlers of the second network topology include at least a second media server; and
configure the data stream handlers of the second network topology to handle the data streams of the video communication session at a second time during the video communication session, including instructing the first media server to offload at least some of the data streams of the video communication session to the second media server.

19. The system of claim 18, wherein the computer-executable instructions cause the system to:
send usage probes that prompt a plurality of media servers to send usage data for the plurality of media servers, the plurality of media servers including the second media server; and
select the second media server from among the plurality of media servers based on the usage data for the plurality of media servers and the usage data associated with the video communication session.

20. The system of claim 18, wherein the video communication session is a first communication session and the usage probes are data packets configured to simulate a reference communication session.

* * * * *